(12) United States Patent
Bourlier et al.

(10) Patent No.: US 11,746,843 B2
(45) Date of Patent: Sep. 5, 2023

(54) BRAKE DISC ASSEMBLY

(71) Applicant: Honeywell International Inc., Charlotte, NC (US)

(72) Inventors: Ryan Bourlier, Elkhart, IN (US); William E Pajak, Chesterton, IN (US); David R. Cole, Walkerton, IN (US); Eric Payton, Edwardsburg, MI (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/448,164

(22) Filed: Sep. 20, 2021

(65) Prior Publication Data
US 2022/0003287 A1    Jan. 6, 2022

Related U.S. Application Data

(63) Continuation of application No. 16/502,446, filed on Jul. 3, 2019, now Pat. No. 11,125,289.

(51) Int. Cl.
*F16D 65/12* (2006.01)
*F16D 55/40* (2006.01)
(Continued)

(52) U.S. Cl.
CPC ........... *F16D 65/122* (2013.01); *F16D 55/40* (2013.01); *F16D 65/126* (2013.01);
(Continued)

(58) Field of Classification Search
None
See application file for complete search history.

(56) References Cited

U.S. PATENT DOCUMENTS 3,018,852 A    1/1962   Stanton
3,209,846 A *  10/1965  Karlen ................ G01G 11/043
                                                    177/16
(Continued)

FOREIGN PATENT DOCUMENTS

CN    106917836 A      7/2017
CN    107445639 A  *  12/2017
(Continued)

OTHER PUBLICATIONS

Response to Office Action dated Oct. 29, 2021, from U.S. Appl. No. 16/691,253, filed Jan. 31, 2022, 8 pp.
(Continued)

*Primary Examiner* — Melanie Torres Williams
(74) *Attorney, Agent, or Firm* — Shumaker & Sieffert, P.A.

(57) ABSTRACT

An article includes a structural core, one or more friction pads, and a plurality of elongated fasteners. The structural core includes two core surfaces and a plurality of pockets extending between the core surfaces. Each friction pad includes a pad surface and a friction surface opposite the pad surface. Each pad surface includes a planar pad surface configured to contact the core surface and a plurality of bosses extending from the first planar pad surface and including a bore. Each planar pad surface is at least about 50% of a surface area of the respective first and second pad surfaces. The plurality of bosses engages with the plurality of pockets to position the respective first and second friction pads relative to the structural core. The plurality of elongated fasteners passes through bores of corresponding bosses of friction pads to fasten the friction pads to the structural core.

19 Claims, 5 Drawing Sheets

(51) Int. Cl.
    *F16D 69/04* (2006.01)
    *F16D 55/00* (2006.01)
(52) U.S. Cl.
    CPC .. *F16D 69/0408* (2013.01); *F16D 2055/0058* (2013.01); *F16D 2069/0433* (2013.01); *F16D 2069/0441* (2013.01); *F16D 2200/0052* (2013.01)

(56) References Cited

U.S. PATENT DOCUMENTS

| | | |
|---|---|---|
| 3,473,637 A | 10/1969 | Rutt |
| 3,552,533 A | 1/1971 | Nitz et al. |
| 3,724,613 A | 4/1973 | Bermingham |
| 3,759,354 A | 9/1973 | Dowell et al. |
| 3,857,469 A | 12/1974 | Stimson |
| 3,920,108 A | 11/1975 | Ely |
| 3,946,192 A * | 3/1976 | Allen ................ B22F 7/08 188/218 XL |
| 4,102,438 A | 7/1978 | Rancourt |
| 4,613,021 A | 9/1986 | Lacombe et al. |
| 4,742,948 A | 5/1988 | Fisher et al. |
| 5,558,186 A | 9/1996 | Hyde et al. |
| 5,769,185 A | 6/1998 | Main et al. |
| 5,779,006 A | 7/1998 | Hyde et al. |
| 6,205,633 B1 | 3/2001 | Niespodziany et al. |
| 6,702,068 B1 | 3/2004 | Riebe |
| 7,858,187 B2 | 12/2010 | Simpson et al. |
| 8,383,197 B2 | 2/2013 | La Forest et al. |
| 8,657,020 B1 | 2/2014 | Constans |
| 8,657,080 B2 | 2/2014 | Constans |
| 8,746,427 B2 | 6/2014 | Foege et al. |
| 8,789,665 B2 | 7/2014 | Gilboy et al. |
| 9,366,302 B1 | 6/2016 | Kirkpatrick |
| 9,689,450 B2 | 6/2017 | Arbesman et al. |
| 9,695,891 B2 | 7/2017 | Kirkpatrick |
| 10,094,439 B2 | 10/2018 | Charles et al. |
| 2006/0046059 A1 | 3/2006 | Arico et al. |
| 2013/0075207 A1 | 3/2013 | Bruntz |
| 2017/0114847 A1 | 4/2017 | Ferrari et al. |
| 2018/0252284 A1 | 9/2018 | Charles et al. |
| 2019/0359233 A1 | 11/2019 | Kato et al. |
| 2021/0003183 A1 | 1/2021 | Bourlier et al. |
| 2021/0156440 A1 | 5/2021 | Pajak et al. |

FOREIGN PATENT DOCUMENTS

| | | |
|---|---|---|
| EP | 3428470 A1 | 1/2019 |
| EP | 3489538 A1 | 5/2019 |
| EP | 3760890 A1 | 1/2021 |
| EP | 3859186 A1 | 8/2021 |
| FR | 1340798 A | 10/1963 |
| FR | 2326623 A1 | 4/1977 |
| GB | 1197669 A | 7/1970 |
| GB | 1349444 | 4/1974 |
| JP | H09242798 A * | 9/1997 |
| RU | 2510387 C1 * | 3/2014 |
| WO | 2004/029473 A1 | 4/2004 |
| WO | 2005/116476 A2 | 12/2005 |

OTHER PUBLICATIONS

Examination Report from counterpart European Application No. 20181784.8, dated Feb. 15, 2021, 5 pp.
Extended Search Report from counterpart European Application No. 20181784.8, dated Nov. 10, 2020, 8 pp.
Response to Examination Report dated Feb. 15, 2021, from counterpart European Application No. 20181784.8, filed Apr. 21, 2021, 24 pp.
Response to Office Action dated Feb. 4, 2021, from U.S. Appl. No. 16/502,446, filed Apr. 30, 2021, 14 pp.
Response to Search Report dated Nov. 10, 2020, from counterpart European Application No. 20181784.8, filed Nov. 30, 2020, 19 pp.
Prosecution History from U.S. Appl. No. 16/502,446, dated Oct. 16, 2019 through May 26, 2021, 37 pp.
Notice of Allowance from U.S. Appl. No. 16/691,253, dated Mar. 15, 2022, 8 pp.
Office Action from U.S. Appl. No. 16/691,253, dated Oct. 29, 2021, 9 pp.
Notice of Intent to Grant and Text Intended to Grant from counterpart European Application No. 20181784.8 dated May 6, 2022, 39 pp.

* cited by examiner

FIG. 3

BRAKE DISC ASSEMBLY

The present application is a continuation of U.S. application Ser. No. 16/502,446, entitled "BRAKE DISC ASSEMBLY" and filed on Jul. 3, 2019, the entirety of which is hereby incorporated by reference.

TECHNICAL FIELD

The disclosure relates to brake discs.

BACKGROUND

An aircraft braking system may be used for various purposes, such as for slowing or stopping the aircraft while maneuvering on the ground. For example, when a jet-powered aircraft lands, the aircraft braking system, various aerodynamic drag sources (e.g., flaps, spoilers, and the like) and aircraft thrust reversers may be used to slow the aircraft down in the desired runway distance. Once the aircraft is sufficiently slowed and taxiing from the runway toward its ground destination, the aircraft braking system may be used to slow the aircraft and bring it to a stop at its final ground destination.

SUMMARY

The disclosure describes brake disc assemblies that include a structural core and one or more friction pads. The friction pads include raised structures ("bosses") that fit into and mechanically interface with inset structures ("pockets") of the structural core and a pad surface that contacts and thermally interfaces with a core surface of the structural core. The friction pads may be configured to provide a friction surface for the brake disc assembly, while the structural core may be configured to provide strength to the brake disc assembly and remove heat from the friction pads.

In one example, an article includes a structural core, a first friction pad, a second friction pad, and a plurality of elongated fasteners. The structural core includes a first core surface, a second core surface, and a plurality of pockets extending between the first core surface and the second core surface. The first friction pad includes a first pad surface and a first friction surface opposite the first pad surface. The first pad surface includes a first planar pad surface configured to contact the first core surface and a first plurality of bosses extending from the first planar pad surface, in which each of the first plurality of bosses includes a first bore. Similarly, the second friction pad includes a second pad surface and a second friction surface opposite the second pad surface. The second pad surface includes a second planar pad surface configured to contact the second core surface and a second plurality of bosses extending from the second planar pad surface, in which each of the second plurality of bosses includes a second bore. Each elongated fastener is configured to pass through the first bore of a corresponding one of the first plurality of bosses and the second bore of a corresponding one of the second plurality of bosses to fasten the first and second friction pads to the structural core. The first and second plurality of bosses are configured to engage with the plurality of pockets to position the respective first and second friction pads relative to the structural core. Each of the first and second planar pad surfaces comprises at least about 50% of a surface area of the respective first and second pad surfaces.

In another example, a method includes positioning a first plurality of bosses extending from a first planar pad surface of a first friction pad into a plurality of pockets extending between a first core surface and a second core surface of a structural core to contact the first planar pad surface with the first core surface. The first friction pad includes a first pad surface and a first friction surface opposite the first pad surface. Similarly, the method includes positioning a second plurality of bosses extending from a second planar pad surface of a second friction pad into the plurality of pockets extending between a first core surface and a second core surface if a structural core to contact the second planar pad surface with the second core surface. The second friction pad includes a second pad surface and a second friction surface opposite the second pad surface. The method further includes passing a plurality of elongated fasteners through a first bore of a respective one of the first plurality of bosses and a second bore of a respective one of the second plurality of bosses. The method further includes securing the plurality of elongated fasteners to fasten the first and second friction pads to the structural core.

In another example, a brake disc includes a structural core and a plurality of removable friction pads attachable to the structural core. One or more structural features of the structural core are configured to pair with one or more structural features of the plurality of removable friction pads. As a result, the one or more structural features of the structural core and the one or more structural features of the plurality of removeable friction pads are configured to transfer a load from the plurality of friction pads to the structural core. One or more surfaces of the structural core are configured to contact one or more surfaces of the plurality of removable friction pads. The structural core is configured to remove heat from the plurality of removeable friction pads through the one or more surfaces of the plurality of removeable friction pads.

The details of one or more examples of the disclosure are set forth in the accompanying drawings and the description below. Other features, objects, and advantages of the disclosure will be apparent from the description and drawings, and from the claims.

DETAILED DESCRIPTION

The present disclosure describes brake disc assemblies that include a structural core and one or more friction pads that interface with the structural core.

In example aircraft braking systems, one or more rotatable brake discs ("rotors") may be mechanically connected to one or more wheels of the vehicle and one or more stationary brake discs ("stators") may be mechanically connected to the body of the aircraft. The rotatable and stationary brake discs may be alternately splined to a torque tube or wheel rim of an aircraft wheel to define a brake disc stack. To produce a desired braking force, a brake actuator may engage the rotatable and stationary brake discs may engage with each other. The friction between the brake discs converts the kinetic energy of the moving aircraft to thermal energy, causing the aircraft to slow down or stop.

According to principles of the disclosure, a brake disc includes a structural core and one or more friction pads. The structural core includes a plurality of pockets extending through the structural core. Each friction pad includes a plurality of raised bosses that fit into the pockets of the structural core and transfer at least a portion of torque received by the friction pad during braking to the structural core. Each friction pad may also include a high proportion, such as greater than 50%, of a total surface area of the friction pad in contact with the structural core to transfer thermal energy to the structural core for dissipation. In brake discs that include opposing friction pads, corresponding bosses of the opposing friction pads may be directly mated and secured using a recessed fastener that is subject to primarily tensile stresses. Materials used for the one or more friction pads may be selected for desirable friction properties, while materials used for the structural core may be selected for desirable mechanical, corrosive, and/or thermal properties.

Figure 1:
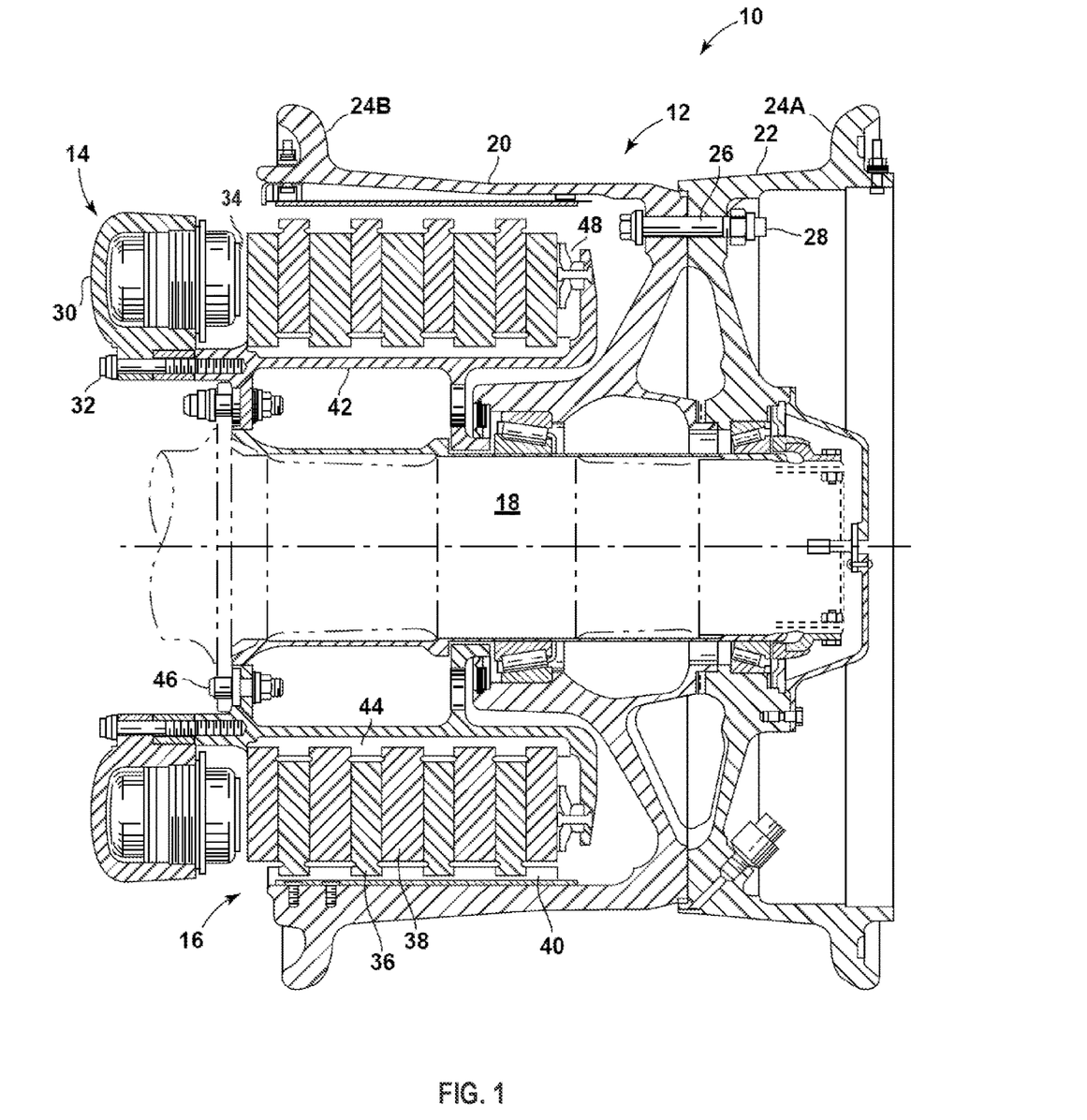
FIG. 1 is a conceptual diagram illustrating an example wheel and brake assembly that may include brake disc assemblies formed in accordance with the techniques of this disclosure.

FIG. 1 is a conceptual diagram illustrating an example wheel and brake assembly 10 that may include one or more of brake disc assemblies, according to examples of the disclosure. For ease of description, examples of the disclosure will be described primarily with regard to aircraft brake assemblies. However, the articles of this disclosure may be used to form brake components other than aircraft brake discs. For example, the brake components may be used as friction materials in other types of braking applications and vehicles.

In the example of FIG. 1, wheel and brake assembly 10 includes a wheel 12, an actuator assembly 14, a brake stack 16, and an axle 18. Wheel 12 includes wheel hub 20, wheel outrigger flange 22, bead seats 24A and 24B, lug bolt 26, and lug nut 28. Actuator assembly 14 includes actuator housing 30, actuator housing bolt 32, and ram 34. Brake stack 16 includes alternating rotor brake discs 36 and stator brake discs 38; rotor brake discs 36 are configured to move relative to stator brake discs 38. Rotor brake discs 36 are mounted to wheel 12, and in particular wheel hub 20, by beam keys 40. Stator brake discs 38 are mounted to axle 18, and in particular torque tube 42, by splines 44. Wheel and brake assembly 10 may support any variety of private, commercial, or military aircraft or other type of vehicle.

Wheel and brake assembly 10 includes wheel 12, which in the example of FIG. 1 is defined by a wheel hub 20 and a wheel outrigger flange 22. Wheel outrigger flange 22 may be mechanically affixed to wheel hub 20 by lug bolts 26 and lug nuts 28. Wheel 12 defines bead seals 24A and 24B. During assembly, an inflatable tire (not shown) may be placed over wheel hub 20 and secured on an opposite side by wheel outrigger flange 22. Thereafter, lug nuts 28 can be tightened on lug bolts 26, and the inflatable tire can be inflated with bead seals 24A and 24B providing a hermetic seal for the inflatable tire.

Wheel and brake assembly 10 may be mounted to a vehicle via torque tube 42 and axle 18. In the example of FIG. 1, torque tube 42 is affixed to axle 18 by a plurality of bolts 46. Torque tube 42 supports actuator assembly 14 and stator brake discs 38. Axle 18 may be mounted on a strut of a landing gear (not shown) or other suitable component of the vehicle to connect wheel and brake assembly 10 to the vehicle.

During operation of the vehicle, braking may be necessary from time to time, such as during landing and taxiing procedures of an aircraft. Wheel and brake assembly 10 is configured to provide a braking function to the vehicle via actuator assembly 14 and brake stack 16. Actuator assembly 14 includes actuator housing 30 and ram 34. Actuator assembly 14 may include different types of actuators such as one or more of, e.g., an electrical-mechanical actuator, a hydraulic actuator, a pneumatic actuator, or the like. During operation, ram 34 may extend away from actuator housing 30 to axially compress brake stack 16 against compression point 48 for braking.

Brake stack 16 includes alternating rotor brake discs 36 and stator brake discs 38. Rotor brake discs 36 are mounted to wheel hub 20 for common rotation by beam keys 40. Stator brake discs 38 are mounted to torque tube 42 by splines 44. In the example of FIG. 1, brake stack 16 includes four rotors and five stators. However, a different number of rotors and/or stators may be included in brake stack 16 in other examples.

In some examples, rotor brake discs 36 and stator brake discs 38 may be mounted in wheel and brake assembly 10 by beam keys 40 and splines 44, respectively. In some examples, beam keys 40 may be circumferentially spaced about an inner portion of wheel hub 20. Beam keys 40 may, for example, be shaped with opposing ends (e.g., opposite sides of a rectangular) and may have one end mechanically affixed to an inner portion of wheel hub 20 and an opposite end mechanically affixed to an outer portion of wheel hub 20. Beam keys 40 may be integrally formed with wheel hub 20 or may be separate from and mechanically affixed to wheel hub 20, e.g., to provide a thermal barrier between rotor brake discs 36 and wheel hub 20. Toward that end, in different examples, wheel and brake assembly 10 may include a heat shield (not shown) that extends out radially and outwardly surrounds brake stack 16, e.g., to limit thermal transfer between brake stack 16 and wheel 12.

In some examples, splines 44 may be circumferentially spaced about an outer portion of torque tube 42. As such, stator brake discs 38 may include a plurality of radially inwardly disposed lug notches along an inner diameter of the brake disc configured to engage with splines 44. Similarly, rotor brake discs 36 may include a plurality of radially inwardly disposed lug notches along an outer diameter of the brake disc configured to engage with beam keys 40. As such rotor brake discs 36 will rotate with the motion of the wheel while stator brake discs 38 remain stationary allowing the friction surfaces of an adjacent stator brake disc 38 and rotor brake disc 36 to engage with one another to deaccelerate the rotation of wheel 12.

Rotor brake discs 36 and stator brake discs 38 may provide opposing friction surfaces for braking an aircraft. As kinetic energy of a moving aircraft is transferred into thermal energy in brake stack 16, temperatures may rapidly increase in brake stack 16. As such, rotor brake discs 36 and stator brake discs 38 that form brake stack 16 may include robust, thermally stable materials capable of operating at very high temperatures and quickly dissipating heat. As torque is applied to brake stack 16, stresses may increase in brake stack 16. As such, rotor brake discs 36 and stator brake discs 38 that form brake stack 16 may include strong, corrosion resistant materials capable of operating at high stresses. However, these thermal and structural properties may not be available in a single material. For example, materials with high thermal stability may not transfer heat efficiently or provide high strength.

Figure 2A:
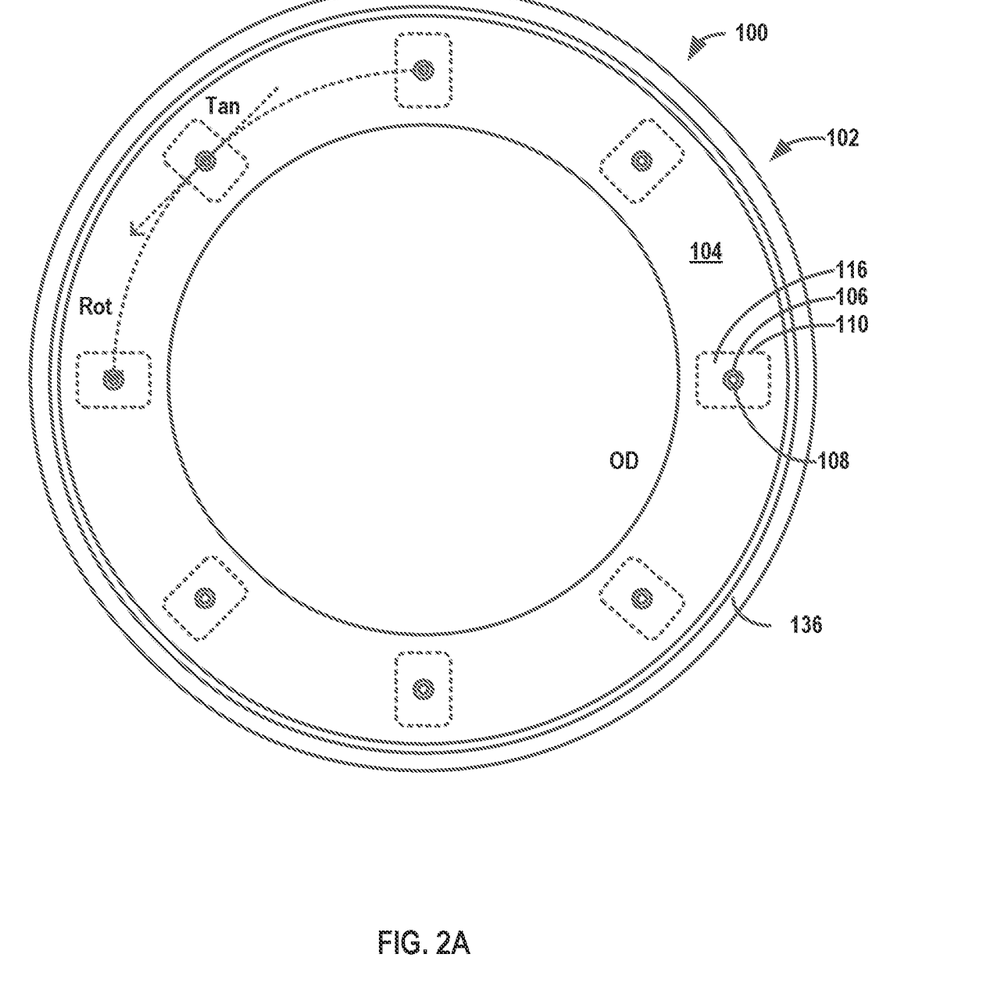
FIG. 2A is a schematic front view diagram of an example brake disc assembly, according to examples of the disclosure.
Figure 2B:
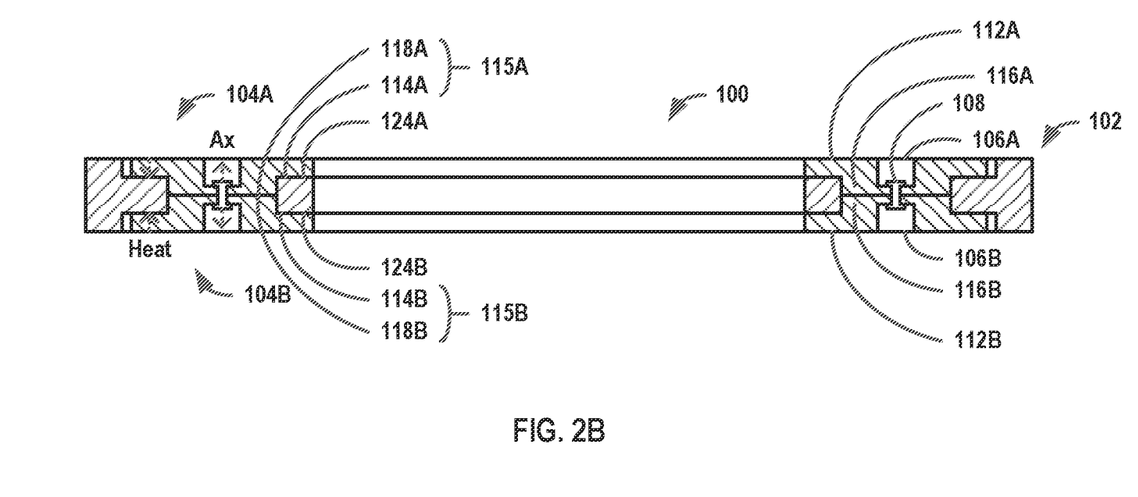
FIG. 2B is a schematic cross-sectional side view diagram of an example brake disc assembly, according to examples of the disclosure.

In some examples, at least one rotor brake disc of rotor brake discs 36 and/or at least one stator brake disc of stator brake discs 38 are formed from a structural core and one or more friction pads on one or more sides of the structural core. FIG. 2A is a schematic front view diagram of an example brake disc assembly 100, while FIG. 2B is a schematic cross-sectional side view diagram of example brake disc assembly 100 of FIG. 2A, according to examples of the disclosure. Brake disc assembly 100 includes a structural core 102 and a plurality of friction pads on one or more sides of structural core 102. In the example of FIGS. 2A and 2B, the plurality of friction pads includes a first friction pad 104A and a second friction pad 104B (referred to singularly and collectively as "friction pad 104" and "friction pads 104").

Brake disc assembly 100 may be used for any one or more of rotor brake discs 36 and/or stator brake discs 38. Brake disc assembly 100 may be used, for example, as rotor brake discs 36 or stator brake discs 38 of FIG. 1. As used herein a "brake disc" and "brake disc assembly" may be used interchangeably to describe either a rotor disc or a stator disc. Likewise, the terms "friction pad" and "structural core" are used to describe a friction pad and structural core for either a rotor or stator disc and are not intended to impart a geometric configuration specific to one or the other.

Structural core 102 may be a disc or annulus having a first core surface 124A and a second core surface 124B (referred to singularly and collectively as "core surface 124" and "core surfaces 124") that are oppositely oriented from each other and configured to receive and interface with corresponding friction pads 104A and 104B. Correspondingly, each friction pad 104 may be a disc or annulus having a corresponding pad surface 115A and 115B (referred to singularly and collectively as "pad surface 115" and "pad surfaces 115") and a corresponding friction surface 112A and 112B (referred to singularly and collectively as "friction surface 104" and "fiction surfaces 104") that are oppositely oriented from each other. Each pad surface 115 of friction pad 104 is configured to be received by structural core 102 and interface with a core surface 124 on a same side of structural core 102 and a support structure, such as another friction pad 104, on an opposite side of structural core 102.

By forming structural core 102 and friction pads 104 as independent components, materials forming the components may be tailored to exhibit different mechanical, chemical, and/or thermal properties, such as improved friction properties for friction pads 104 and improved strength, corrosion resistance, and/or thermal transfer properties for structural core 102. Further, structural core 102 and friction pads 104 may include various structural and surface features configured to relieve stress and/or remove heat from fiction pads 104 to allow further differentiation in material properties between structural core 102 and friction pads 104. The resultant brake disc assembly 100 may exhibit both improved strength within the underlying structural core 102 and improved frictional properties associated with friction pads 104.

First and second core surfaces 124 of structural core 102 may include one or more structural features configured to pair and interface with one or more friction pads 104. Correspondingly, first and second pad surfaces 115 of friction pads 104 may include one or more structural features configured to pair and interface with the one or more structural features of structural core 102. The structural features of structural core 102 and fiction pads 104 may provide improved load distributions, better friction pad retention, reduced costs associated with manufacturing and assembly, as well as other benefits described in further detail below. The structural features of structural core 102 may include, for example, one or more of geometrically complementing pockets 110 (shown as dashed lines) and corresponding bosses 116 for pairing and distributing torque load forces between structural core 102 and a respective friction pad 104.

First and second core surfaces 124 of structural core 102 may also include a high percentage of surface area configured to thermally contact pad surfaces 115 of friction pads 104. First and second core surfaces 124 may thermally contact friction pads 104 by being close enough in proximity to friction pads 104 that friction pads 104 transfer heat to first and second core surfaces 124, such as through direct contact or contact through an intermediate layer or volume. Correspondingly, first and second pad surfaces 115 of friction pads 104 may include a high percentage of surface area configured to thermally contact structural core 102. The high percentage of surface area of structural core 102 and friction pads 104 that are in thermal contact may provide improved removal and dissipation of heat (e.g., higher heat removal rate, lower temperature, and/or more even temperature distribution) from friction pads 104 to structural core 102. The proportion of surface area of friction pads 104 thermally contacting structural core 102 may be, for example, greater than 50% of a total surface area of a pad surface 115 of a respective friction pad 104 facing structural core 102, such as greater than 70% of the total surface area of the pad surface 115, or greater than 90% of the total surface area of pad surface 115.

Friction pads 104 may include one or more securing features configured to secure opposing friction pads 104 to each other. The securing features of friction pads 104 may provide for improved ease of installation and manufacturing. The securing features of friction pads 104 may include, for example, one or more bores 106 for extending and securing a fastener 108 between friction pads 104.

Structural core 102 includes first core surface 124A on a first side and second core surface 124B on a second side. Structural core 102 also includes a plurality of pockets 110 extending between first core surface 124A and second core surface 124B. First friction pad 104A includes a first friction surface 112A, a first planar pad surface 114A, and a first plurality of bosses 116A extending from first planar pad surface 114A. Second friction pad 104B includes a second friction surface 112B, a second planar pad surface 114B, and a second plurality of bosses 116B extending axially outward (e.g., along an intended axis of rotation of structural core 102) from second planar pad surface 114B. Each of the first plurality of bosses 116A includes a first bore 106A and each of the second plurality of bosses 116B includes a second bore 106B.

As illustrated in FIG. 2B, when brake disc assembly 100 is assembled, first planar pad surface 114A contacts first core surface 124A and second planar pad surface 114B contacts second core surface 124B. First plurality of bosses 116A and second plurality of bosses 116B engage with the plurality of pockets 110 of structural core 102 to position the respective first friction pad 104A and second friction pad 104B relative to structural core 102. An elongated fastener of a plurality of elongated fasteners 108 passes through first bore 106A of a corresponding one of the first plurality of bosses 116A and the second bore 106B of a corresponding one of the second plurality of bosses 116B to fasten first friction pad 104A and second friction pad 104B to structural core 102.

During braking, torque applied against friction pads 104 and heat generated by friction pads 104 may be transferred to structural core 102. For example, first and second friction surfaces 112A and 112B (referred to singularly and collectively as "friction surface 112" and "friction surfaces 112") may receive torque from adjacent friction surfaces and transfer at least a portion of the torque to structural core 102 through the first and second plurality of bosses 116A and 116B (referred to singularly and collectively as "plurality of bosses 116" and "pluralities of bosses 116") of friction pads 104 to the plurality of pockets 110 of structural core 102. Friction surfaces 112 may also generate heat during braking and dissipate at least a portion of the heat to structural core 102 from core surfaces 124 of structural core 102 to first and second planar pad surfaces 114A and 114B (referred to singularly and collectively as "planar pad surface 114" and "planar pad surfaces 114") of friction pads 104. Fastener 108 securing friction pad 104A and friction pad 104B may receive a tensile force and transfer the tensile force to an opposite one friction pads 104 and, correspondingly, an opposite core surface of structural core 102. In this way, torque and heat produced during braking may be transferred from friction pads 104 to structural core 102, such that friction pads 104 may operate under lower stresses and/or at lower or more even temperatures than disc brake assemblies that do not include structural and surface properties of disc brake assembly 100.

Figure 2C:
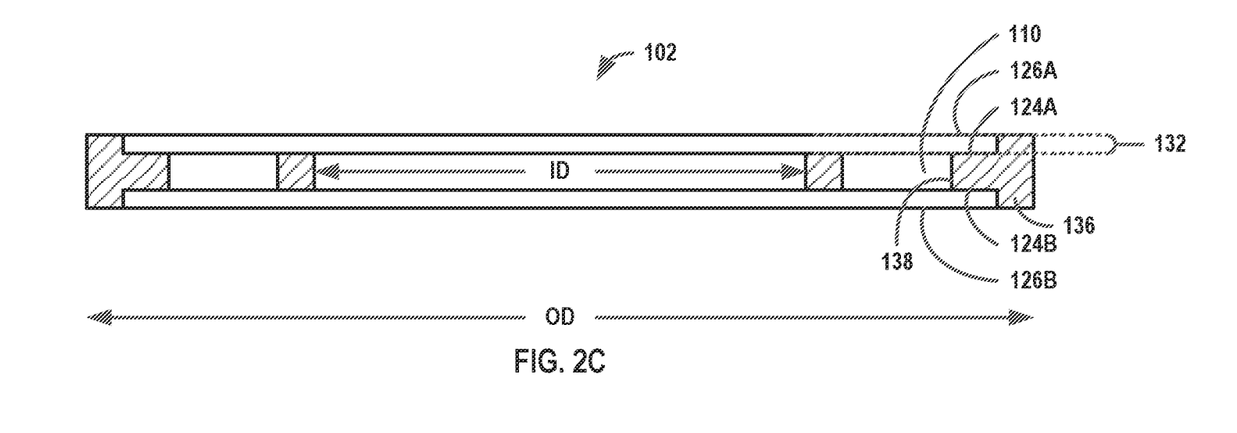
FIG. 2C is a schematic cross-sectional side view diagram of an example structural core, according to examples of the disclosure.

FIG. 2C is a schematic cross-sectional side view diagram of example structural core 102, according to examples of the disclosure. Structural core 102 includes first core surface 124A, second core surface 124B, and the plurality of pockets 110 extending between first core surface 124A and second core surface 124B. Structural core 102 is configured to position friction pad 104 relative to structural core 102 using the plurality of pockets 110. Each pocket of the plurality of pockets 110 is configured to engage with a boss of the plurality of bosses 116 of at least one friction pad 104 to position the respective friction pad 104 relative to structural core 102. During attachment of friction pad 104 to structural core 102, the plurality of pockets 110 may receive a plurality of bosses 116 of at least one friction pad 104, such that friction pad 104 may be quickly and/or easily positioned relative to structural core 102.

Structural core 102 is configured to receive a braking force or torque from at least one friction pad 104 through the plurality of pockets 110. Each pocket of the plurality of pockets 110 is configured to receive a boss of the plurality of bosses 116 of at least one friction pad 104 and includes a pocket wall 138 intersecting a plane of each core surface 124. During braking, at least a portion of pocket wall 138 may receive a portion of the braking force from the boss of the corresponding friction pad 104. As such, the braking force may be distributed over the plurality of pockets 110. In some examples, each pocket of the plurality of pockets 110 may be configured to receive a first boss (e.g., first boss 116A) from a first friction pad (e.g., first friction pad 104A) and a second boss (e.g., second boss 116B) from a second friction pad (e.g., second friction pad 104B), such that a surface of the first boss and a surface of the second boss may contact.

In addition to supporting friction pad 104, structural core 102 is configured to receive thermal energy from at least one friction pad 104 through at least one of core surfaces 124. Each core surface 124 may be configured to contact planar pad surface 114 of at least one friction pad 104. Contact between planar pad surface 114 of the respective friction pad 104 and the respective core surface 124 may provide for conductive heat transfer of heat generated by friction pad 104 to the respective core surface 124. In some examples, each core surface 124 may be configured so that at least 50% of a pad surface of a respective friction pad or combination of friction pads may contact the respective core surface 124. For example, each core surface 124 may have a shape and/or size such that substantially all of a pad surface of the respective friction pad that is not positioned in the plurality of pockets 110 may be contacting a respective core surface 124. In this way, heat may be more quickly and/or evenly removed from friction pad 104, such that friction pad 104 may have a lower and/or more even temperature than a friction pad that does not have a high surface area contacting a structural member.

In some examples, structural core 102 includes rim 136 on an outer edge of structural core 102. Rim 136 defines a first rim surface 126A extending axially beyond first core surface 124A and a second rim surface 126B extending axially beyond second core surface 124B. While not shown, rim 136 may include drive regions for coupling to beaming keys. For example, rather than couple friction pads 104 to beaming keys, structural core 102 may interface with beaming keys through the drive regions, such that friction pads 104 may be less complex to manufacture. Additionally or alternatively, rim 136 may be configured to increase a drive region contacting beam keys, which may distribute load more effectively to the beam keys. In some example, rim 136 may be configured such that a gap exists between an outer edge of the respective friction pad and an inner radial surface of rim 136. This gap may reduce vibration as the fiction pads wear down by reducing friction surface of a rotor and stator from contacting on an outer diameter/inner diameter interface.

Structural core 102 may be a disc or annulus that defines an inner diameter (ID) and outer diameter (OD) having first core surface 124A and second core surface 124B oppositely oriented from each other and configured to receive friction pads 104. Structural core 102 may have a variety of dimensions (e.g., outer diameter, inner diameter, thickness, etc.), which may depend on its use (e.g., braking loads). A thickness of structural core 102 may depend on strength and thermal aspects of a design of structural core 102, as well as material properties of structural core 102. In some examples, structural core 102 may have a thickness between first core surface 124A and second core surface 124B that is between about 0.125 inches and about 2 inches.

In some examples, the dimensions of structural core 102 may be selected to provide for improved thermal contact with friction pads 104. For example, as a contact area between a surface of structural core 102 and friction pad 104 increases, an amount of thermal energy that may be transferred from friction pad 104 to structural core 102 increases for a given temperature gradient between structural core 102 and friction pad 104. In some examples, structural core 102 may have an inner diameter and outer diameter such that substantially all (e.g., greater than 95%) of planar pad surface 114 of friction pad 104 may be in contact with one of core surface 124A or core surface 124B when friction pad 104 is received on the respective core surface 124.

In some examples, the plurality of pockets 110, and correspondingly, the plurality of bosses 116, may be configured such that a structural integrity of structural core 102 and friction pads 104 may be improved. For example, the plurality of bosses 116 and the plurality of pockets 110 may be sized to have an area parallel to friction surfaces 112 to overcome shear loading stresses exerted on the plurality of bosses. As another example, the plurality of bosses 116 and the plurality of pockets may be sized so that a shear load on structural core 102 may not exceed an integrity threshold. As such, a size of the plurality of pockets 110 and the plurality of bosses 116 may be balanced between a structural integrity of structural core 102 and a structural integrity of friction pads 104. As another example, the plurality of pockets 110 and the plurality of bosses 116 may have a thickness sufficient to overcome bearing load stresses.

The plurality of pockets 110 may be configured with a size, orientation, and distribution based on a variety of factors including, but not limited to, surface area for each pocket, surface area of the plurality of pockets, ratio of tangential surface area (e.g., a surface area of each pocket in a direction tangent to a direction of rotation of structural core 102) to axial surface area, and the like. In some examples, the size, shape, and location of the plurality of pockets 110 may be standardized, such that a variety of friction pads 104 having different properties may be used with structural core 102. For example, a service life of structural core 102 may be significantly longer than a service life of friction pads 104, such that friction pads 104 may be replaced and, in some instances, updated with other friction pads 104. As another example, a common friction pad 104 may be used with a variety of structural cores 102. For instance, a structural core for a rotor with drive regions on an outer diameter may be slightly different from a structural core for a stator with drive regions on an inner diameter, but both rotor and stator may use a same friction pad. Such cross-compatibility may reduce a number of designs of fraction pads 104 for forming a brake.

The plurality of pockets 110 may have a variety of sizes and dimensions. In some examples, each pocket of the plurality of pockets has a circumferential dimension (e.g., measured from a center of each pocket along a rotational arc parallel to a direction of rotation of structural core 102) that is between about 0.25 inches, such as for a high number of pockets 110 and/or friction pads 104, and about 12 inches, such as for a low number of pockets 110 and/or friction pads 104. In some examples, each pocket of the plurality of pockets has a radial dimension (e.g., measured from a center of each pocket along a radial direction from a center of structural core 102) that is between about 0.25 inches and about 8 inches. The plurality of pockets 110 may have a variety of quantities. In some examples, a number of the plurality of pockets 110 is between 3, such as for designs having a low number of fraction pads 104 each having a high surface area, and 36, such as for designs having a high number of friction pads 104 each having a low surface area.

The plurality of pockets 110 may have a variety of shapes in a radial plane including, but not limited to, rectangles, rounded rectangles, circles, wedges, and the like. In some examples, the plurality of pockets 110 may have a shape and orientation with a high tangential surface area. For example, as illustrated in FIG. 2A, a braking force may be exerted substantially tangent to structural core 102, parallel to a major surface of structural core (e.g., core surface 124A or core surface 124B). As such, pockets that are shaped and oriented such that pocket wall 138 has high surface area facing the direction of braking force may distribute a received force over a greater surface area.

The plurality of pockets 110 may have a variety of configurations and patterns. In some examples, a number and/or tangential surface area that corresponds to an amount of force received from a radial distance from a center of structural core 102. In some examples, the plurality of pockets 110 may be symmetrical in at least one plane. In some examples, each of the plurality of pockets 110 may be located a same radial distance from a center of structural core 102, such that each pocket of the plurality of pockets 110 may receive substantially a same torque. In some examples, the plurality of pockets 110 may be located at different radial distances from the center of structural core 102.

Structural core 102 may be manufactured from a variety of materials including, but not limited to, metals, such as aluminum, stainless steel, and titanium alloys; carbon composites (e.g., carbon-carbon composites); and the like. In some examples, structural core 102 may be fabricated from one or more materials capable of being refurbished, such that a service life of structural core 102 may be substantially longer than friction pad 104.

In some examples, structural core 102 may be manufactured from a material having a high strength, particularly in the circumferential direction. For example, as discussed above, structural core 102 may be configured to receive a braking force from friction pads 104. As such, structural core 102 may be manufactured from materials that have a high strength to withstand various forces on structural core due to the received braking force. In some examples, structural core 102 has a high strength (tensile, compressive, and/or shear) at elevated temperatures experienced during braking.

In some examples, structural core 102 may be manufactured from a material having an ability to receive and/or store large amounts of heat. For example, as discussed above, structural core 102 may be configured to receive heat from friction pads 104. As such, structural core 102 may be manufactured from materials that have a high specific heat capacity to receive large amounts of heat, and/or other thermal properties such as high thermal effusivity or high thermal diffusivity. In some examples, structural core 102 includes a material having a specific heat capacity greater than 200 J/kg·K at room temperature, such as greater than 475 J/kg·K. For example, tungsten carbide may have a specific heat of greater than 200 J/kg·K, steel may have a specific heat capacity greater than 475 J/kg·K, and boron-nitride may have a specific heat capacity greater than 1500 J/kg·K. In some examples, structural core 102 includes a material having a thermal conductivity greater than 7 W/m·K at room temperature, such as greater than 20 W/m·K. For example, titanium alloys may have a thermal conductivity greater than 7 W/m·K. In some examples, structure core 102 includes a material having a thermal conductivity greater than carbon (~23 W/m·K).

In some examples, structural core 102 include a carbon composite. For example, structural core 102 may be formed from a carbon-carbon composite fabricated from a densified carbon material. In some examples, the carbon material may include a plurality of carbon fibers and densifying material. The carbon fibers may be composed of carbon or carbon precursor materials such as polyacrylonitrile (PAN) or rayon, which may be converted into carbon thorough a carbonization process. The carbon fibers used to form core structure 102 may be arranged in a woven or non-woven as either a single layer or multilayer structure. In some examples in with both structural core 102 and friction pads 104 are carbon composites, structural core 102 and/or friction pads 104 may include the same underlying carbon architecture (e.g., both woven) or may include different carbon fiber architectures (e.g., woven core structure and non-woven friction pads) depending on the desired mechanical or friction properties. In some examples, carbon-carbon composite materials tailored for improved strength aspects may include woven carbon fibers and a reinforcement material (e.g., carbonized pitch or resin). The woven structure of the carbon fiber matrix may improve the resulting strength characteristics of structural core 102 compared to a non-woven architecture.

In some examples, structural core 102 may be manufactured through relatively simple manufacturing processes, such as cutting (e.g., milling, drilling) and casting (e.g., die casting) processes. For example, structural features of structural core 102, such as the plurality of pockets 110 and rim 136, may involve relatively simple geometries (e.g., generally square angles between core surfaces 124 and pocket wall 138) that are relatively simple to fabricate. As such, standard machining and manufacturing processes that are suitable for these simple geometries may be used to more quickly and/or inexpensively manufacture structural core 102. Additionally or alternatively, such simple geometries may allow for easier refurbishing or repair of structural core 102, such that a service life of structural core 102 may be more easily and/or inexpensively extended.

Figure 2D:
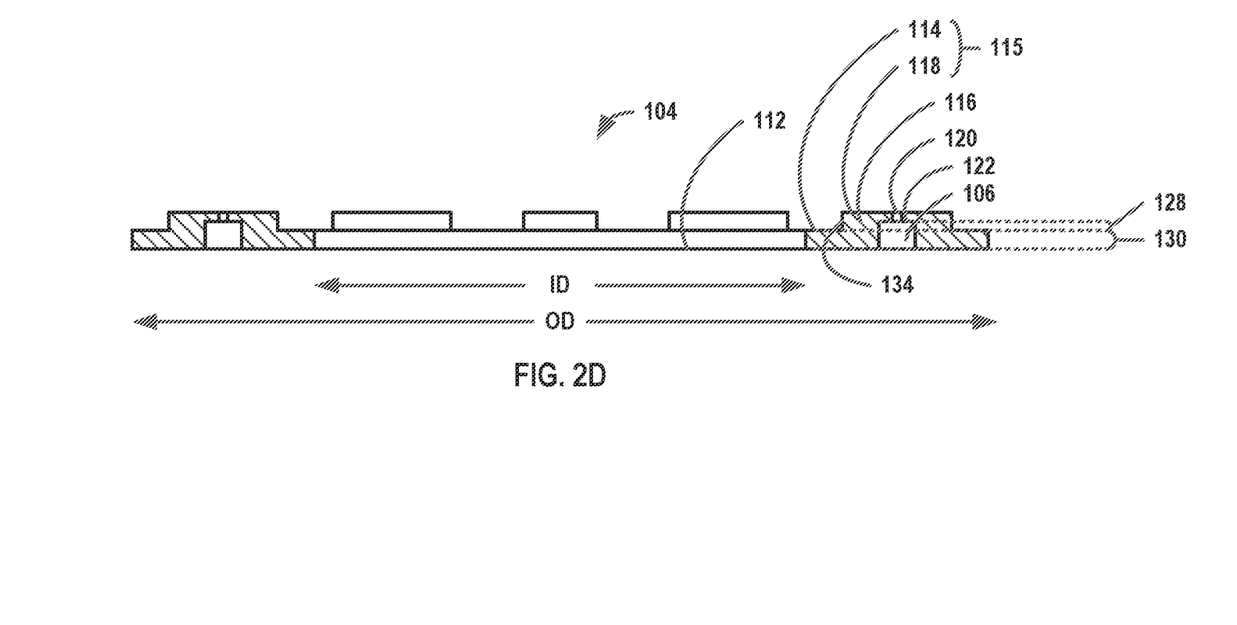
FIG. 2D is a schematic cross-sectional side view diagram of an example friction pad, according to examples of the disclosure.

FIG. 2D is a schematic cross-sectional side view diagram of example friction pad 104, according to examples of the disclosure. Friction pad 104 includes a pad surface 115 and a friction surface 112 opposite the pad surface 115. Pad surface 115 includes planar pad surface 114 and a boss surface 118 for each boss of the plurality of bosses 116 extending from planar pad surface 114. Planar pad surface 114 is configured to contact and thermally interface with one of core surfaces 124.

Each boss of the plurality of bosses 116 is configured to engage with a pocket of the plurality of pockets 110 of structural core 102 to position the respective friction pad 104 relative to structural core 102. For example, each boss of the plurality of bosses 116 may have a size or shape that complements a pocket of the plurality of pockets 110. During attachment of friction pad 104 to structural core 102, the plurality of bosses 116 may fit into a plurality of pockets 110 of structural core 102, such that friction pad 104 may be quickly and/or easily positioned relative to structural core 102.

Friction pad 104 is configured to transfer a braking force or torque to structural core 102 through the plurality of bosses 116. Each boss of the plurality of bosses 116 is configured to be received by a pocket of the plurality of pockets 110 of structural core 102 and includes a boss wall 134 intersecting a plane of planar pad surface 114. During braking, at least a portion of boss wall 134 is configured to contact at least a portion of a corresponding pocket wall 138 when the plurality of bosses 116 is engaged with the plurality of pockets 110, such that at least a portion of boss wall 134 may transfer a portion of the braking force to the pocket of structural core 102. In this way, a braking force may be applied through a surface area of boss wall 134 of the plurality of bosses 116 to structural core 102.

In addition to transferring the braking force, friction pad 104 is configured to convert kinetic energy to thermal energy and transfer at least a portion of the thermal energy to structural core 102 through pad surface 114. Planar pad surface 114 is configured to contact core surface 124 of structural core 102. Contact between core surface 124 and planar pad surface 114 may provide for conductive heat transfer of heat generated by friction surface 112 of friction pad 104 to the respective core surface 124. In some examples, thermal contact between structural core 102 and friction pad 104 may be expressed as a portion (e.g., percentage) of total surface area of friction pad 104 that is configured to contact structural core 102 (e.g., planar pad surface 114). Planar pad surface 114 includes at least about 50% of a surface area of pad surface 115. In some examples, planar pad surface 114 includes at least about 70% of a surface area of pad surface 115, such as at least about 95%.

Friction pad 104 is configured to secure to structural core 102 using a fastener, such fastener 108. Each of the plurality of bosses 116 includes a bore 106. Bore 106 is configured to receive fastener 108 and pass-through fastener 108 through a through-hole 120 to a structure on an opposing side of structural core 102, such as another friction pad 104 in a two-sided disc brake in a middle of brake disk stack 16 or a support structure in a one-sided disc brake at an end of brake disk stack 16.

In some examples, friction pad 104 may be configured to have an increased usable depth of friction surface 112 over a life of friction pad 104 by recessing bore 106. For example, the depth of friction surface 112 may be limited by a closer (e.g. nearer to friction surface 112) of core surface 124 of structural core 102 or fastener 108 in bore 106, such that by recessing bore 106, fastener 108 may not limit a depth of friction surface 112. In some examples, an inner bore surface 122 of each bore 106 extends a recess distance 128 beyond a plane of planar pad surface 114. In some examples, recess distance 128 is greater than a head height of fastener 108, such as greater than about 0.1 inches. During use, friction surface 112 of friction pad 104 may not wear down to fastener 108, such that friction pad 104 may remain secured to structural core 102. In some examples, a thickness 132 of rim 136 between rim surface 126 and planar core surface 124 is about a thickness 130 of friction pad 104 between friction surface 112 and planar pad surface 114, in which thickness 130 represents a usable depth of friction surface 112 over the life of friction pad 104.

Friction pad 104 may be in the shape of a disc or annulus defining an outer preform diameter (OD) and inner preform diameter (ID). In some examples, the outer diameter (OD) of friction pad 104 may be about 12 inches (e.g., about 37 cm) to about 25 inches (e.g., about 64 cm) and the inner preform diameter (ID) of friction pad 104 may be about 4.5 inches (e.g., about 12 cm) to about 15 inches (e.g., about 38 cm).

The plurality of bosses 116 may be configured with a size, orientation, and distribution based on a variety of factors including, but not limited to, thermal expansion of the boss and/or pocket, bearing area of the boss and/or pocket, shear area of the boss and/or pocket, surface area for each pocket, surface area of the plurality of pockets, ratio of tangential surface area (e.g., a surface area of each boss in a direction tangent to a direction of rotation of friction pad 104) to axial surface area, and the like. The plurality of bosses 116 may have a size, orientation, or distribution that complements the plurality of pockets 110.

The plurality of bosses 116 may have a variety of sizes and dimensions. In some examples, each boss of the plurality of bosses 116 has a circumferential dimension (e.g., measured from a center of each boss along a rotational arc parallel to a direction of rotation of frictional pad 104) that is between about 0.25 inches and about 12 inches. In some examples, each boss of the plurality of bosses 116 has a radial dimension (e.g., measured from a center of each pocket along a radial direction from a center of friction pad 104) that is between about 0.25 inches and about 8 inches.

The plurality of bosses 116 may have a variety of shapes including, but not limited to, rectangles, rounded rectangles, circles, wedges, and the like, corresponding to a shape of the plurality of pockets 110 of structural core 102. In some examples, the plurality of bosses 116 may have a shape and orientation with a high tangential surface area. For example, as illustrated in FIG. 2A, a braking force may be exerted substantially tangent to structural core 102. As such, bosses that are shaped and oriented such that boss wall 134 has high surface area facing the direction of braking force may transfer a force over a greater surface area. In some examples, each boss surface 118 is configured to contact a corresponding boss surface 118 of another boss of a second plurality of bosses of another friction pad when the plurality of bosses 116 and the second plurality of bosses are engaged with the plurality of pockets 110. As such, the plurality of bosses of two opposing friction pads may extend through a corresponding pocket 110 and contact substantially a full interior surface of the corresponding pocket 110.

The plurality of bosses 116 may have a variety of configurations and patterns. In some examples, a number and/or tangential surface area that corresponds to an amount of force received from a radial distance from a center of friction pad 104. In some examples, the plurality of pockets 116 may be symmetrical in at least one plane. In some examples, the plurality of pockets 116 may have a same radial distance from a center of friction pad 104, such that each boss of the plurality of bosses 116 may transfer substantially a same torque. In some examples, the plurality of bosses 116 may have different radial distances from the center of friction pad 104.

In some examples, friction pads 104 may be cross-compatible with both rotor and stator brake discs. For example, rotors, stators, and end plates may use a same friction pad 104 attached to different style structural cores 102. As long as the plurality of pockets 110 of each structural core 102 for stators, rotors, or end plates correspond to the plurality of pockets 116 of friction pads 104, such friction pads may be used with the corresponding structural core 102, despite different designs of other sections of structural core 102. Such cross-compatibility may reduce a number of parts to be manufactured, which may reduce an inventory and allow for cheaper manufacturing.

Friction pads 104 may be manufactured from a variety of materials including, but not limited to, ceramics; metals or metal-containing materials; carbon composites; and the like. In some examples, friction pad 104 may be manufactured from a material having a high thermal stability, a high wear resistance, and/or stable friction properties. For example, as discussed above, friction pad 104 is configured to convert kinetic energy to thermal energy. As such, friction pad 104 may be manufactured from materials that have a high thermal stability to withstand high temperatures. In some examples, friction pad 104 includes a material having an operating temperature threshold greater than about 1100° C. such as greater than about 1700° C. For example, carbon may withstand operating temperature greater than about 1725° C.

In some examples, friction pad 104 includes a carbon composite. For example, friction pad 104 may be formed from a carbon-carbon composite fabricated from a densified carbon material. In some examples, the carbon material may include a plurality of carbon fibers and densifying material. The carbon fibers may be composed of carbon or carbon precursor materials such as polyacrylonitrile (PAN) or rayon, which may be converted into carbon thorough a carbonization process. The carbon fibers used to form friction pad 104 may be arranged in a woven or non-woven as either a single layer or multilayer structure. In some examples, carbon-carbon composite materials tailored for improved friction aspects may include non-woven carbon fibers and a reinforcement material (e.g., carbonized pitch or resin). The non-woven structure of the carbon fiber matrix may improve the resulting frictional characteristics of friction pad 104 compared to a woven architecture.

Figure 3:
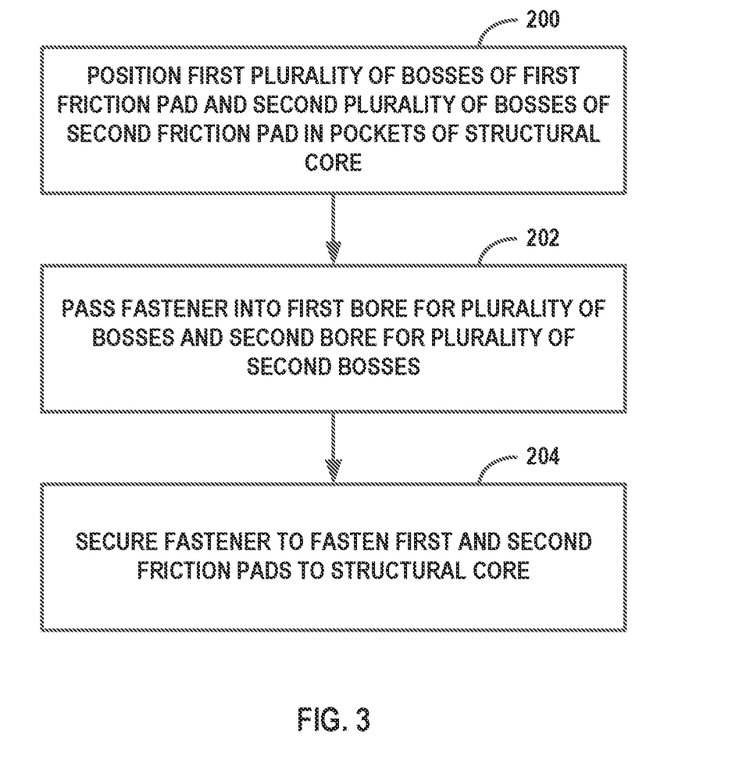
FIG. 3 is a flow diagram illustrating an example technique of assembling a brake disc assembly, according to examples of the disclosure.

FIG. 3 is a flow diagram illustrating an example technique of assembling example brake disc assembly 100, according to examples of the disclosure. FIG. 3 will be described with reference to brake disc assembly 100 of FIGS. 2A-2D. However, it will be understood that the techniques of FIG. 3 may be used to assembly other articles. The technique of FIG. 3 includes positioning the first plurality of bosses 116A of first friction pad 104A into the plurality of pockets 110 of structural core 102 to contact first planar pad surface 114A with first core surface 124A and positioning the second plurality of bosses 116B of second friction pad 104B into the plurality of pockets 110 of structural core 102 to contact second planar pad surface 114B with second core surface 124B. The technique of FIG. 3 further includes passing a plurality of elongated fasteners 108 through a first bore 106A of a respective one of the first plurality of bosses 116A and a second bore 106B of a respective one of the second plurality of bosses 116B. The technique of FIG. 3 further includes securing the plurality of elongated fasteners 108 to fasten first friction pad 104A and second friction pad 104B to structural core 102.

Various examples have been described. These and other examples are within the scope of the following claims.

What is claimed is:

1. A brake disc assembly comprising:
   a structural core comprising one or more core structural features; and
   a plurality of removable friction pads attachable to the structural core,
   wherein each removable friction pad of the plurality of removable friction pads comprises a pad surface and a friction surface opposite the pad surface,
   wherein the pad surface comprises:
      a planar pad surface configured to contact the structural core and transfer heat to the structural core; and
      one or more pad structural features configured to:
         pair with the one or more core structural features to transfer a load from the corresponding removable friction pad to the structural core; and
         extend through the structural core to contact a friction pad of the plurality of removeable friction pads on an opposite side of the structural core, and
   wherein the planar pad surface comprises at least about 70% of a total surface area of the pad surface of the corresponding friction pad.

2. The brake disc assembly of claim 1, wherein the planar pad surface comprises at least about 90% of the total surface area of the pad surface of the corresponding friction pad.

3. The brake disc assembly of claim 1, wherein each removable friction pad of the plurality of removable friction pads comprises a carbon/carbon composite having an operating temperature threshold greater than 1100° C.

4. The brake disc assembly of claim 1, wherein the structural core comprises a material having a specific heat capacity greater than 200 J/kg·K.

5. The brake disc assembly of claim 1, wherein the structural core comprises a material having a thermal conductivity greater than 7 W/m·K.

6. The brake disc assembly of claim 1, wherein each removable friction pad of the plurality of removable friction pads comprises a material having an operating temperature threshold greater than 1700° C.

7. The brake disc assembly of claim 1, wherein each pad structural feature of the one or more pad structural features is configured to receive a fastener of a plurality of fasteners and transfer the load normal to the friction surface to the corresponding fastener.

8. The brake disc assembly of claim 7, wherein, when the plurality of removable friction pads are secured to the structural core by the plurality of fasteners, each fastener does not contact the one or more core structural features.

9. The brake disc assembly of claim 1, wherein the one or more pad structural features are shaped and oriented to substantially transfer the load from the corresponding removable friction pad to the structural core in a direction that is substantially tangent to a direction of rotation of the structural core.

10. The brake disc assembly of claim 1, wherein the one or more pad structural features are configured to contact substantially a full interior surface of the corresponding core structural feature.

11. A method, comprising:
pairing a plurality of removable friction pads with a structural core, wherein each removable friction pad of the plurality of removable friction pads comprises a pad surface and a friction surface opposite the pad surface, and wherein, once paired:
a planar pad surface contacts the structure core and transfers heat to the structural core; and
one or more pad structural features of the pad surface pair with one or more core structural features of the structural core to transfer a load from the corresponding removable friction pad to the structural core, wherein the planar pad surface comprises at least about 70% of a total surface area of the pad surface of the corresponding friction pad; and
securing the plurality of removable friction pads to the structural core.

12. The method of claim 11, wherein the planar pad surface comprises at least about 90% of the total surface area of the pad surface of the corresponding friction pad.

13. The method of claim 11, wherein each removable friction pad of the plurality of removable friction pads comprises a carbon/carbon composite having an operating temperature threshold greater than 1100° C.

14. The method of claim 11, wherein the structural core comprises a material having a specific heat capacity greater than 200 J/kg·K and a thermal conductivity greater than 7 W/m·K.

15. The method of claim 11, wherein, when the plurality of removable friction pads are paired with the structural core, the one or more pad structural features extend through the structural core to contact a friction pad of the plurality of removeable friction pads on an opposite side of the structural core.

16. The method of claim 11,
wherein each pad structural feature of the one or more pad structural features is configured to receive a fastener of a plurality of fasteners and transfer a load normal to the friction surface to the corresponding fastener, and
wherein securing the plurality of removable friction pads to the structural core comprises:
inserting the plurality of fasteners through the one or more pad structural features; and
securing the plurality of removable friction pads to the structural core by the plurality of fasteners.

17. The method of claim 16, wherein, when the plurality of removable friction pads are secured to the structural core by the plurality of fasteners, each fastener does not contact the one or more core structural features.

18. A brake assembly, comprising:
a brake stack comprising a plurality of rotor brake discs and a plurality of stator brake discs alternately arranged along an axis; and
an actuator assembly configured to compress the brake stack along the axis,
wherein at least one brake disc of each of the pluralities of rotor and stator brake discs comprises:
a structural core comprising one or more core structural features; and
a plurality of removable friction pads attachable to the structural core,
wherein each removable friction pad of the plurality of removable friction pads comprises a pad surface and a friction surface opposite the pad surface,
wherein the pad surface comprises:
a planar pad surface contacting the structural core and transfer heat to the structural core; and
one or more pad structural features:
paired with the one or more core structural features to transfer a load from the corresponding removable friction pad to the structural core; and
extending through the structural core to contact a friction pad of the plurality of removeable friction pads on an opposite side of the structural core, and
wherein the planar pad surface comprises at least about 70% of a total surface area of the pad surface of the corresponding friction pad.

19. The brake assembly of claim 18, wherein the planar pad surface comprises at least about 90% of the total surface area of the pad surface of the corresponding friction pad.

* * * * *